United States Patent
Buonvino et al.

(10) Patent No.: US 11,739,643 B2
(45) Date of Patent: Aug. 29, 2023

(54) METHOD AND APPARATUS FOR COOLING A PORTION OF A COUNTER-ROTATING TURBINE ENGINE

(71) Applicant: GE Avio S.r.l., Rivalta di Torino (IT)

(72) Inventors: Alberto Buonvino, Turin (IT); Daniele Coutandin, Avigliana (IT); Luca Giacobone, Turin (IT); Riccardo Da Soghe, Florence (IT); Cosimo Bianchini, Florence (IT)

(73) Assignee: GE AVIO S.r.l., Rivalta di Torino (IT)

(*) Notice: Subject to any disclaimer, the term of this patent is extended or adjusted under 35 U.S.C. 154(b) by 117 days.

(21) Appl. No.: 17/154,153

(22) Filed: Jan. 21, 2021

(65) Prior Publication Data

US 2021/0301665 A1 Sep. 30, 2021

(30) Foreign Application Priority Data

Mar. 26, 2020 (IT) .................. 102020000006439

(51) Int. Cl.
*F01D 5/08* (2006.01)
*F02C 3/067* (2006.01)
*F02C 6/08* (2006.01)
*F01D 5/03* (2006.01)

(52) U.S. Cl.
CPC .............. *F01D 5/085* (2013.01); *F02C 3/067* (2013.01); *F02C 6/08* (2013.01); *F01D 5/03* (2013.01); *F05D 2260/232* (2013.01); *F05D 2260/606* (2013.01)

(58) Field of Classification Search
CPC .......... F01D 5/084; F01D 5/085; F01D 5/088; F01D 1/24; F01D 1/26; F01D 5/03; F02C 3/067; F02C 6/08
See application file for complete search history.

(56) References Cited

U.S. PATENT DOCUMENTS

| | | |
|---|---|---|
| 5,039,278 A | 8/1991 | Wakeman et al. |
| 5,867,980 A | 2/1999 | Bartos |
| 5,899,058 A | 5/1999 | Narcus et al. |
| 7,246,484 B2 | 7/2007 | Giffin, III et al. |
| 7,296,398 B2 | 11/2007 | Moniz et al. |
| 8,434,994 B2 | 5/2013 | Pal et al. |
| 9,234,463 B2 | 1/2016 | Benjamin et al. |
| 10,458,267 B2 | 10/2019 | Gibson et al. |
| 2004/0086377 A1 | 5/2004 | Proctor et al. |
| 2005/0217277 A1* | 10/2005 | Alvanos ............... F01D 25/12 60/782 |

(Continued)

OTHER PUBLICATIONS

Italian Search Report dated Nov. 6, 2020 corresponding to Italian Application No. 102020000006439 filed Mar. 26, 2020.

*Primary Examiner* — Topaz L. Elliott
*Assistant Examiner* — Michael K. Reitz
(74) *Attorney, Agent, or Firm* — McGarry Bair PC

(57) ABSTRACT

A turbine engine having counter-rotating rotors comprising a first rotor, rotating in a first rotational direction, defining a first rotor set of blades axially spaced to define a gap, and a second rotor, rotating in a second rotational direction counter the first rotational direction. The second rotor further including a second set of blades received within the gap of the first rotor. A plurality of fluid passages is formed in the first rotor with an outlet facing the gap.

20 Claims, 4 Drawing Sheets

(56) References Cited

U.S. PATENT DOCUMENTS

| | | | |
|---|---|---|---|
| 2006/0269399 A1* | 11/2006 | Girgis | F01D 11/02 |
| | | | 415/115 |
| 2018/0230805 A1 | 8/2018 | Miller et al. | |
| 2019/0085701 A1* | 3/2019 | Pankaj | F02C 7/32 |
| 2019/0218913 A1 | 7/2019 | Sen et al. | |

* cited by examiner

METHOD AND APPARATUS FOR COOLING A PORTION OF A COUNTER-ROTATING TURBINE ENGINE

CROSS REFERENCE TO RELATED APPLICATIONS

This application claims priority to Italian Patent Application No. 102020000006439, filed Mar. 26, 2020, which is incorporated herein by reference in its entirety.

TECHNICAL FIELD

This disclosure generally relates to a turbine engine having counter rotating rotors, and more specifically to a fluid passage from one rotor cooling the other rotor.

STATEMENT REGARDING FEDERALLY SPONSORED RESEARCH OR DEVELOPMENT

The project leading to this application has received funding from the Clean Sky 2 Joint Undertaking under the European Union's Horizon 2020 research and innovation program under grant agreement No. CS2-LPA-GAM-2018/2019-01.

BACKGROUND

Counter-rotating turbine engines, and particularly gas or combustion counter-rotating turbine engines, are rotary engines that extract energy from a flow of combusted gases passing through the engine onto a multitude of compressor and turbine stages, with each stage typically including a complementary set of rotating blades and counter rotating blades.

A counter-rotating turbine engine can include, in serial flow arrangement, a forward fan assembly, an aft fan assembly, a high-pressure compressor for compressing air flowing through the engine, a combustor for mixing fuel with the compressed air such that the mixture may be ignited, and a high-pressure turbine. The high-pressure compressor, combustor and high-pressure turbine are sometimes collectively referred to as the core engine. In operation, the core engine generates combustion gases which are discharged downstream to a turbine section extracting energy therefrom for powering the forward and aft fan assemblies. Counter-rotating turbine engines can also include pressurized cavities supplied with cooling air and sealed from combustion airflows within the engine.

The compressor and turbine sections of the turbine engine typically include multiple, serially arranged stages, with each stage comprising cooperating sets of circumferentially airfoils, with one set axially spaced from the other set. In a counter-rotating turbine engine, both sets of airfoils can be in the form of sets of blades, with each set rotating in opposite directions. In such a case, the counter-rotating turbine can include an outer rotor having the first set of airfoils that are rotatably coupled to the forward fan assembly, as well as an inner rotor having the second set of airfoils rotatably coupled to the aft fan assembly.

BRIEF DESCRIPTION

In one aspect, the present disclosure relates to a counter-rotating turbine engine comprising a first rotor, rotating in a first rotational direction, and having multiple sets of circumferentially arranged blades, defining first rotor sets of blades that are axially spaced to define a gap between each set, a second rotor, rotating in a second rotational direction, counter to the first rotational direction, and having multiple sets of circumferentially arranged blades, defining second rotor sets of blades that are axially spaced and received within the gap of the first rotor, and a plurality of fluid passages formed in the first rotor with an outlet facing the gap, wherein the fluid passages have a passage centerline oriented to redirect a fluid flow within the fluid passages from the first rotational direction to the second rotational direction.

In another aspect, the present disclosure relates to a method of cooling a blade in a counter-rotating turbine engine having counter rotating first and second rotors, the method comprising emitting cooling air from the first rotor in a direction such that a component of the cooling is in the second rotational direction.

DETAILED DESCRIPTION

Figure 1:
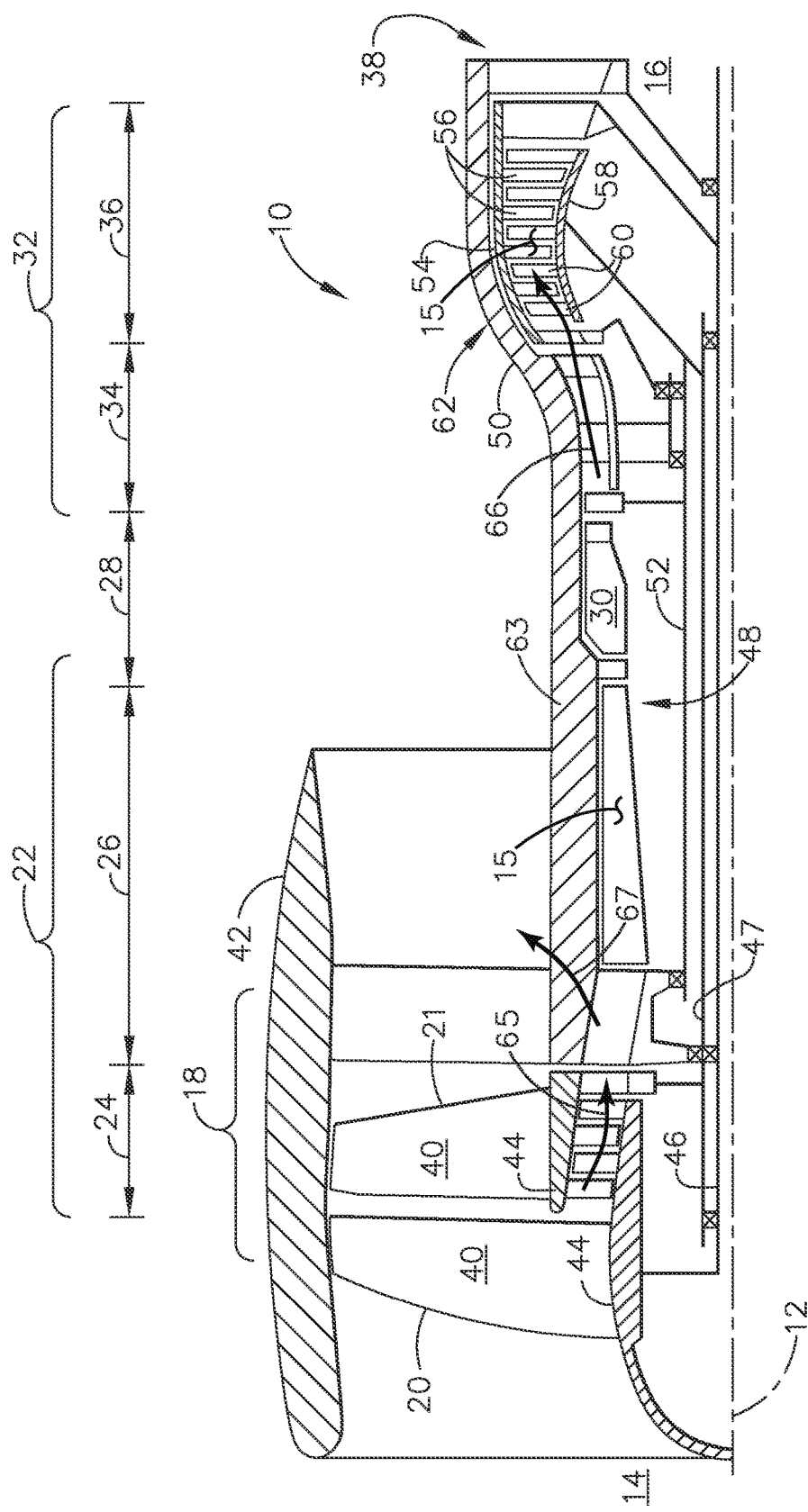
FIG. 1 is a schematic cross-sectional diagram of a counter-rotating turbine engine including a counter-rotating turbine section in accordance with various aspects described herein.

Aspects of the disclosure described herein are directed to cooling an airfoil assembly of one rotor of the counter-rotating turbine engine, with cooling air supplied from another rotor of the counter-rotating turbine engine. The rotors can be inner and outer rotors. While the counter-rotating rotors can be operated at the same speed, but in opposite direction, the rotors can be operated at different speeds, resulting in a Low Speed Rotor (LSR) and a High Speed Rotor (HSR). To effect the cooling, a cooling manifold can be included within one of the rotors and have an outlet passage that opens onto the other rotor.

To counter the effects of windage associated with the counter-rotating rotors, the outlet passage can be oriented such that a component of a centerline for the outlet passage is parallel to the direction of rotation of the other rotor. This results in the air leaving the outlet passage already having a flow component in the same direction as the direction of rotation of the rotor being cooled. Such an orientation of the cooling flow emitted from the cooling passages encounters less wind resistance created by the rotating rotors.

As used herein, the term "upstream" refers to a direction that is opposite a fluid flow direction, and the term "downstream" refers to a direction that is in the same direction as the fluid flow. The term "fore" or "forward" refers to a direction or position in front of a component, and "aft" or "rearward" refers to a direction or position behind a component. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are used only for identification purposes to aid the reader's understanding of the present disclosure, and should not be construed as limiting on an embodiment, particularly as to the position, orientation, or use of aspects of the disclosure described herein. Connection references (e.g., attached, coupled, fixed, connected, joined, and the like) are to be construed broadly and can include intermediate members between a collection of elements and relative movement between elements unless otherwise indicated. As such, connection references do not necessarily infer that two elements are directly connected and in fixed relation to one another. The singular forms "a," "an," and "the" include plural references unless the context clearly dictates otherwise.

The exemplary drawings are for purposes of illustration only and the dimensions, positions, order and relative sizes reflected in the drawings attached hereto can vary.

FIG. 1 is a schematic cross-sectional diagram of a gas turbine engine, specifically a counter-rotating gas turbine (CRT) engine 10 for an aircraft. The CRT engine 10 has a generally longitudinally extending axis or axial centerline 12 extending from a forward direction 14 to an aft direction 16. The CRT engine 10 includes, in downstream serial flow relationship, a fan section 18 including a forward fan assembly 20 and an aft fan assembly 21, a compressor section 22 including a booster or low pressure (LP) compressor 24 and a high pressure (HP) compressor 26, a combustion section 28 including a combustor 30, a turbine section 32 including a HP turbine 34 and an LP turbine 36, and an exhaust section 38.

The fan assemblies 20 and 21 are positioned at a forward end of the CRT engine 10 as illustrated. The terms "forward fan" and "aft fan" are used herein to indicate that one of the fan assemblies 20 is coupled axially upstream from the aft fan assembly 21. It is also contemplated that the fan assemblies 20, 21 can be positioned at an aft end of CRT engine 10. Fan assemblies 20 and 21 each include a plurality of rows of fan blades 40 positioned within a fan casing 42. Fan blades 40 are joined to respective rotor disks 44 that are rotatably coupled through a respective forward fan shaft 46 to the forward fan assembly 20 and through an aft fan shaft 47 to the aft fan assembly 21.

The HP compressor 26, the combustor 30, and the HP turbine 34 form an engine core 48 of the CRT engine 10. The engine core 48 is surrounded by a drum 50 that can be coupled with the fan casing 42. The HP turbine 34 is coupled to the HP compressor 26 via a core rotor or shaft 52. In operation, the engine core 48 generates combustion gases that are channeled downstream to the counter-rotating LP turbine 36 which extracts energy from the gases for powering fan assemblies 20, 21 through their respective fan shafts 46, 47.

In the example shown, the LP turbine 36 is in the form of a counter-rotating turbine. It will be understood that aspects of the disclosure can have applicability toward other turbines, including engines without counter-rotating LP turbines. For example, turbine engines having LP turbines in which static circumferentially-arranged vanes are axially spaced from rotating circumferentially-arranged blades are also contemplated. Furthermore, a turbine engine having a counter-rotating compressor section 22, in particular either a counter-rotating LP compressor 24 or a counter-rotating HP compressor 26, is also contemplated.

The LP turbine 36 includes an outer rotor 54 positioned radially inward from the drum 50. The outer rotor 54 can have a generally frusto-conical shape and include a first set of airfoils 56, circumferentially arranged, that extend radially inwardly towards the axial centerline 12.

The LP turbine 36 further includes an inner rotor 58 arranged substantially coaxially with respect to, and radially inward of, the outer rotor 54. The inner rotor 58 includes a second set of airfoils 60 circumferentially arranged and axially spaced from the first set of airfoils 56. The second set of airfoils 60 extend radially outwardly away from the axial centerline 12. The first and second sets of airfoils 56, 60 together define a plurality of turbine stages 62. In the example of FIG. 1, five turbine stages 62 are shown, and it will be understood that any number of stages can be utilized. Furthermore, while the first set of airfoils 56 are illustrated as being forward of the second set of airfoils 60, the first and second sets of airfoils 56, 60 can be arranged in any suitable manner, including the first set of airfoils 56 being positioned aft of the second set of airfoils 60.

While the CRT engine 10 is described in the context of including a rotating outer rotor 54 and rotating inner rotor 58, it is further contemplated that either of the first set of airfoils 56 or the second set of airfoils 60 can be included in, or form part of, a fixed stator within the CRT engine 10 such that at least a portion of the CRT engine 10 does not counter-rotate. For example, the first set of airfoils 56 can form a set of circumferentially-arranged static vanes forming part of an outer stator within the CRT engine 10, while the second set of airfoils 60 is coupled to the inner rotor 58 and configured to circumferentially rotate about the axial centerline 12. It is further contemplated, the second set of airfoils 60 can be in the form of static vanes coupled to an inner stator within the CRT engine 10, with the first set of airfoils 56 being in the form of blades coupled to an outer rotor.

Complementary to the outer rotor 54 and inner rotor 58, the stationary portions of the CRT engine 10, such as the outer casing or drum 50, are also referred to individually or collectively as a stator 63. As such, the stator 63 can refer to the combination of non-rotating elements throughout the CRT engine 10.

In operation, the airflow exiting the fan section 18 is split such that a portion of the airflow is channeled along a main flow path 15 into the LP compressor 24, which then supplies pressurized airflow 65 to the HP compressor 26, which further pressurizes the air. The pressurized airflow 65 from the HP compressor 26 is mixed with fuel in the combustor 30 and ignited, thereby generating combustion gases 66 along the main flow path 15. Some work is extracted from these combustion gases 66 by the HP turbine 34, which drives the HP compressor 26. The combustion gases 66 are discharged along the main flow path 15 into the LP turbine 36, which extracts additional work to drive the LP compressor 24, and the exhaust gas is ultimately discharged from the CRT engine 10 via the exhaust section 38. The driving of the LP turbine 36 can drive rotation of the forward fan assembly 20 and the LP compressor 24.

A portion of the pressurized airflow 65 can be drawn from the compressor section 22 as bleed air 67. The bleed air 67 can be drawn from the pressurized airflow 65 and provided to engine components requiring cooling. The temperature of pressurized airflow 65 entering the combustor 30 is significantly increased above the bleed air 67 temperature. The bleed air 67 may be used to reduce the temperature of the core components downstream of the combustor.

Some of the air supplied by the forward fan assembly 20, such as the bleed air 67, can bypass the engine core 48 and be used for cooling of portions, especially hot portions, of the CRT engine 10, or for cooling or powering other portions of the CRT engine 10. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
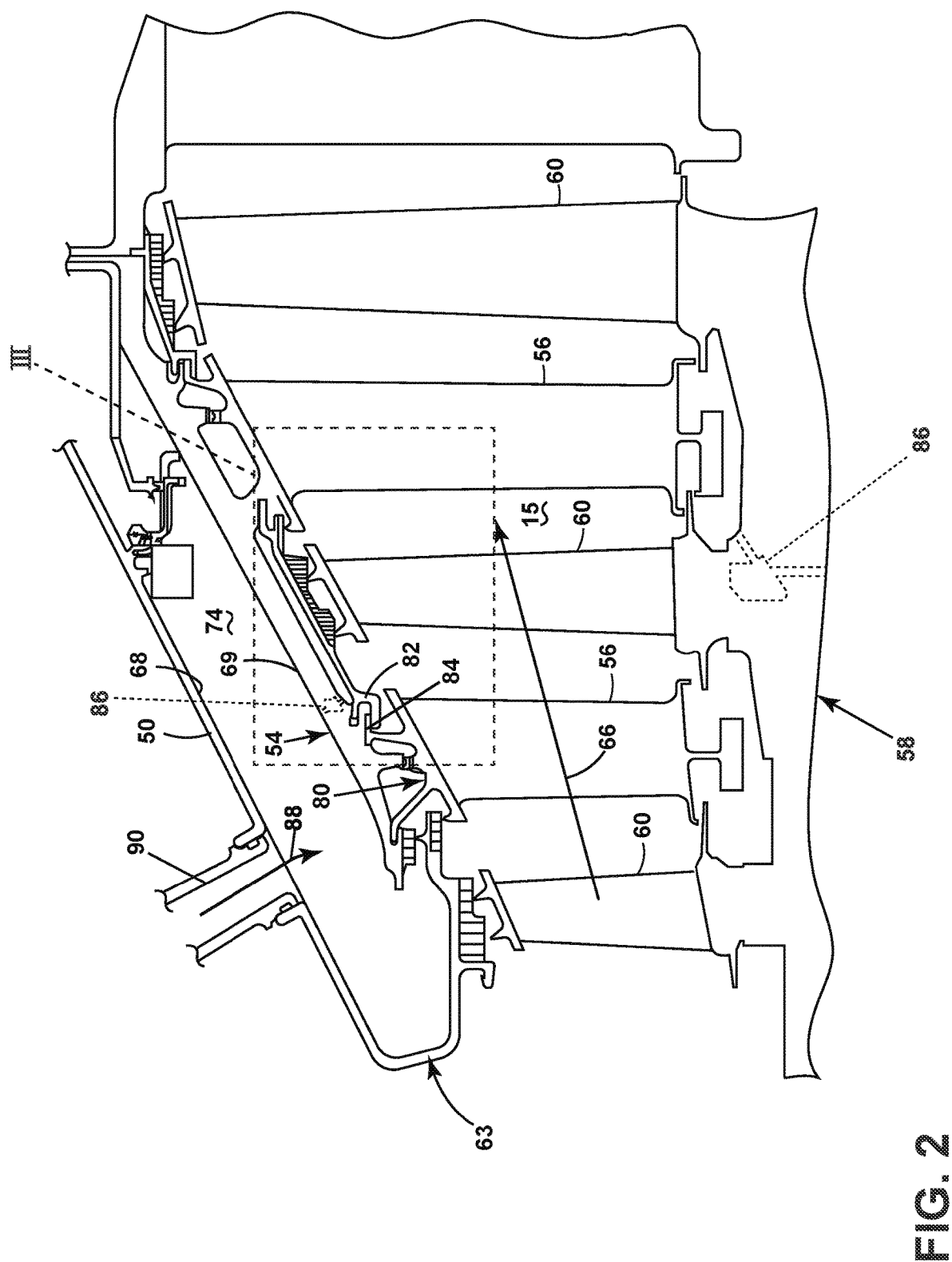
FIG. 2 is a schematic view of a portion of the counter-rotating turbine section of FIG. 1.

FIG. 2 is an enlarged schematic view of a portion of the counter-rotating LP turbine 36. The drum 50 includes a casing surface 68, and the outer rotor 54 has a rotor surface 69 facing the casing surface 68.

A cavity 74 can be at least partially defined as a space between the drum 50 and the outer rotor 54. The cavity 74 can extend at least circumferentially within the CRT engine 10 including, but not limited to, a fully annular cavity 74 or multiple circumferentially-spaced or segmented cavities 74.

By way of non-limiting example, the first set of airfoils 56 can be mounted to the outer rotor 54 via at least one hanger assembly 80. It should be appreciated that multiple hanger assemblies 80 can be provided and arranged circumferentially or axially within the LP turbine 36. Each hanger assembly 80 can include a hook 82 extending from the outer rotor 54. A set of airfoils, such as the first set of airfoils 56, can terminate in a flange 84 configured to be received within the hook 82, thereby securing the first set of airfoils 56 to the outer rotor 54. It should be understood that the first set of airfoils 56 can be mounted to the outer rotor 54 in any suitable manner. It is further contemplated that the hanger assembly 80 can utilize an interference fit with slots in one of the hook 82 or flange 84. In addition, while the hanger assembly 80 is discussed in the context of the first set of airfoils 56, the hanger assembly 80 can also be utilized to secure the second set of airfoils 60 to the inner rotor 58 (FIG. 1).

Figure 3:
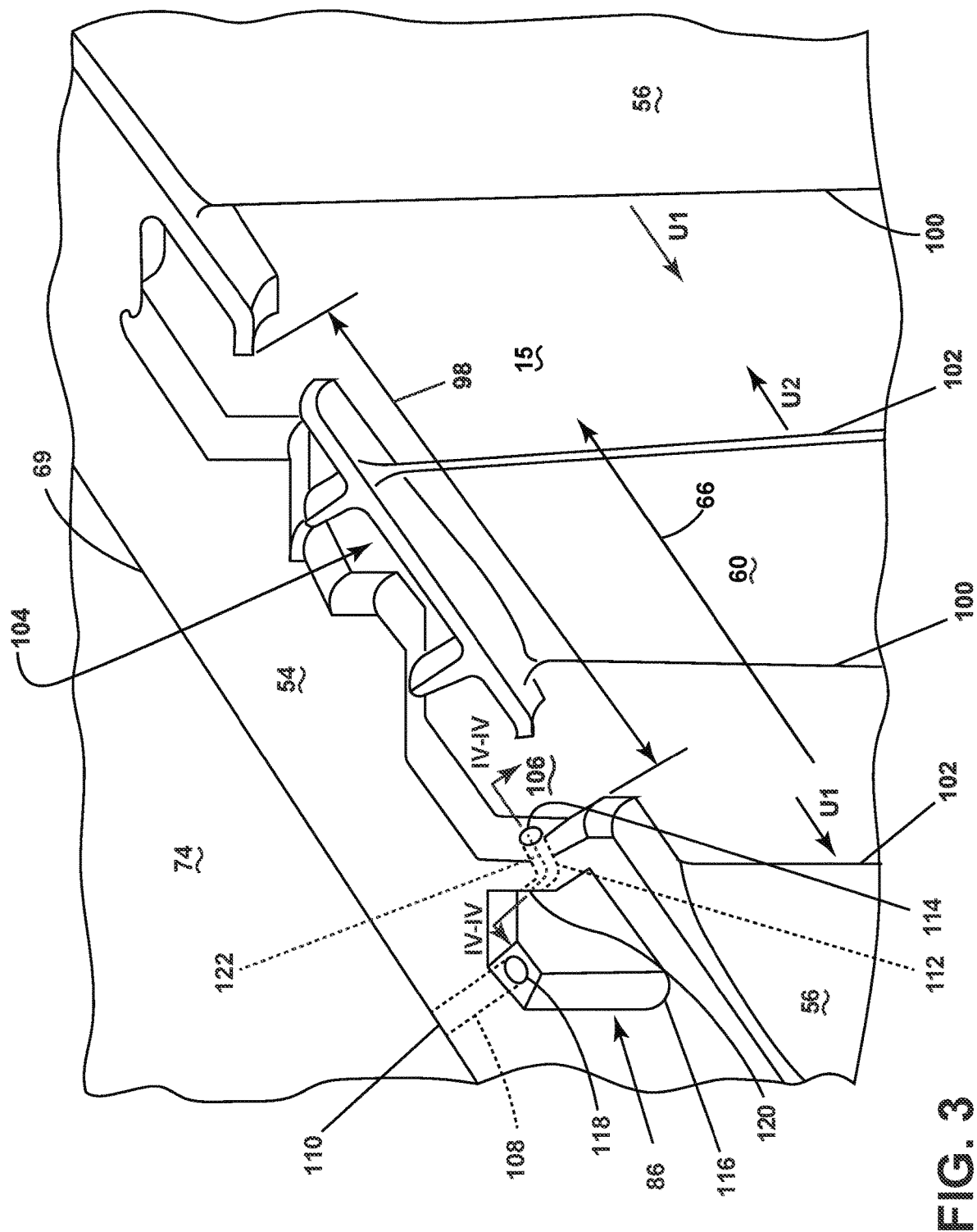
FIG. 3 is a perspective view of the counter-rotating turbine engine take from section III of FIG. 2 including a cooling manifold.

An inlet passage 90 or a bypass air duct can be fluidly coupled to the cavity 74 for supplying pressurized air 88 or cooling air to the cavity 74. The inlet passage 90 can be fluidly coupled to at least a portion of the CRT engine 10 which is not the turbine section 32. For example, the inlet passage 90 can be fluidly coupled to a portion of the compressor section 22 or the fan section 18. As such, the pressurized air 88 can be defined as a bypass air from one or more of the compressor section 22 or the fan section 18. The pressurized air 88 can be further defined to have a lower temperature than the combustion gases 66 within the main flow path 15. A set of fluid passages 86 can be provided within a rotating portion of the CRT engine 10, specifically the LP turbine 36. As illustrated, the inner rotor 58 and the outer rotor 54 include the set of fluid passages 86. The fluid passage 86 can be configured to provide a fluid flow, specifically a cooling air, to at least a portion of the first or second set of airfoils 56, 60. As such, the fluid passages 86 can be defined as a cooling passage. The fluid passage 86 provided within the outer rotor 54 can be fluidly coupled to the space or cavity 74 such that a portion of the pressurized air 88 can flow through the fluid passage 86 and into the main flow path 15. The fluid passage 86 provided within the inner rotor 58 can be fluidly coupled to an inner rotor space different than the cavity 74. For example, the inner rotor 58 can include or be coupled to a rotating shaft which can include a hollow running through the interior of the shaft. The hollow can be fluidly coupled at one end to the compressor section 22 or the fan section 18 of the CRT engine 10. As such, the inner rotor 58, specifically the hollow of the rotating shaft, can be defined to include a bypass passage coupled to a portion of the compressor section 22 or the fan section 18. As such, the fluid passage 86 can be coupled to the bypass passage of the inner rotor 58 such that the fluid passage 86 can provide a cooling air into the main flow path 15. It will be appreciated that the fluid passages 86 illustrated in FIG. 3 are meant to be non-limiting. For example, the fluid passages 86 can form a set of fluid passages 86 formed within a portion of the inner and the outer rotors 54, 58. The set of fluid passages 86 can be circumferentially or axially spaced along any portion of the inner and the outer rotors 54, 58.

FIG. 3 is a schematic cross-section view of the LP turbine 36 of FIG. 2 as seen from enlarged view III in FIG. 3 further illustrating the fluid passage 86 provided within the outer rotor 54. It will be appreciated, however, that the fluid passage 86 can be provided within at least one of either the outer rotor 54 or the inner rotor 58.

The outer rotor 54 can include the first set of airfoils 56, which can rotate with a first rotational velocity U1 in a first rotational direction about the axis 12 as designated by the arrow U1. The first rotational direction is a tangential rotational direction, with respect to the axis 12, such that the first rotational direction is a first tangential rotational direction and that the first rotational velocity U1 is a first tangential rotational velocity U1. As illustrated, there can be a first set and a second set of blades included within the first set of airfoils 56. The first set can be defined to be upstream the second set. The first set and the second set can be axially spaced to define a space or a gap 98 between the first and the second. The second set of airfoils 60 can be provided within the gap 98 defined by the first set of airfoils 56. The second rotor set of airfoils 60 blades 96 can be defined as a set of blades coupled to the inner rotor 58 and configured to rotate with a second rotational velocity U2 in a second rotational direction designated by the arrow U2. The second rotational direction is a tangential rotational direction such that the second rotational direction is a second tangential rotational, with respect to the axis 12, direction and that the second rotational velocity U2 is a second tangential rotational velocity U2.

The first and the second set of airfoils 56, 60 can include a leading edge 100 defined as an upstream edge of the airfoils 56, 60 and a trailing edge 102 defined as a downstream section of the blade. As illustrated, the second set of airfoils 60 can further include a tip 104 located a radially distal portion of the second set of airfoils 60. The tip 104 can be located near and distanced from the outer rotor 54. A recess 106 can be defined by the region between the tip 104 near to the leading edge 100 of the second airfoils 60 to the outer rotor 54. At least a portion of the combustion gases 66 in the main flow path 15 can flow into the recess 106 and around the tip 104.

The first rotational velocity U1 and the second rotating velocity U2 directly oppose each other such that the first and the second set of airfoils 56, 60 can counter-rotate. The first rotational velocity U1 can be smaller than the second rotational velocity U2 such that the outer rotor 54 can be defined as a Low-Speed Rotor (LSR) and the inner rotor 58 can be defined as a High-Speed Rotor (HSR). Alternatively, the first rotational velocity U1 can be equal to the second rotational velocity U2.

The fluid passage 86 provided within the outer rotor 54 can include an inlet passage 108 with an inlet 110 fluidly coupled to the cavity 74. The fluid passage 86 can further include an outlet passage 112 with an outlet 114 fluidly coupled to the recess 106. As such, cooling air from the cavity 74 can flow through the inlet passage 108 and the outlet passage 112 and into the recess 106. The outlet passage 112 can be located upstream the leading edge 100 of the second set of airfoils 60 and downstream the trailing edge of the first set of airfoils 56.

A fluid manifold 116 can be provided between the inlet passage 108 and the outlet passage 112. The fluid manifold 116 can be defined as a cavity formed within the outer rotor 54. The fluid manifold 116 can be a continuous annular cavity such that it extends circumferentially about the outer rotor 54. Alternatively, the fluid manifold 116 can be non-continuous and form a set of fluid manifolds 116 circumferentially spaced about the outer rotor 54. The fluid manifold can include a manifold inlet 118 coupled to the inlet passage 108 and a manifold outlet 120 coupled to the outlet passage 112. As such, fluid can flow from the inlet passage 108, into the fluid manifold 116 and to the outlet passage 112. Collectively, the inlet passage 108, the outlet passage 112, the fluid manifold 116 and their respective components can be defined as the fluid passage 86.

Figure 4:
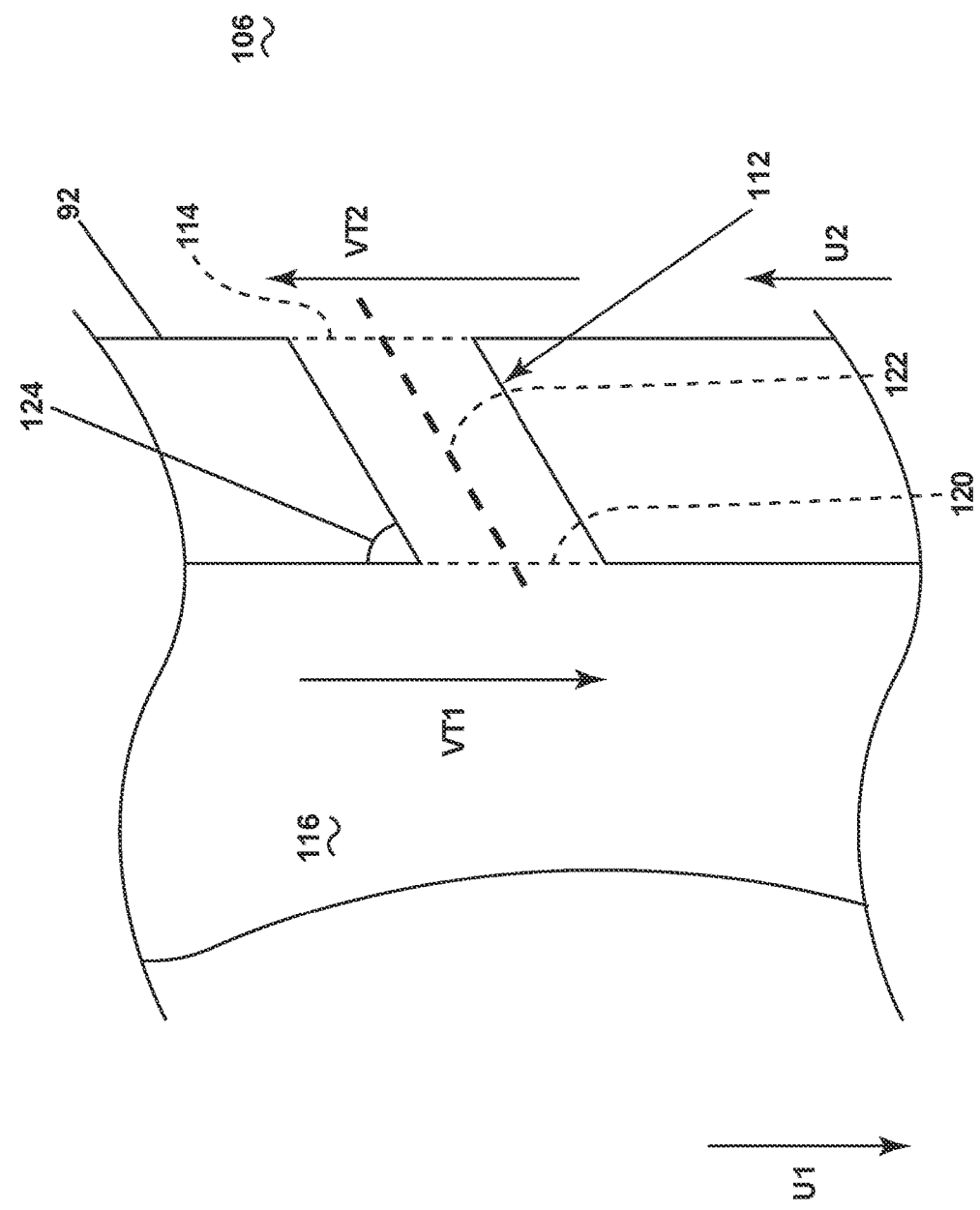
FIG. 4 is a cross-sectional view of a portion of the cooling manifold taken along line IV-IV of FIG. 3

FIG. 4 is a cross-sectional view of a portion of the fluid passage 86, specifically a portion of the fluid manifold 116 and the outlet passage 112 taken from line IV-IV of FIG. 3.

The outlet passage 112, and hence the fluid passage 86, can be further defined by a passage centerline 122. An included angle 124 can be formed by the passage centerline 122 relative to a plane transverse a rotational axis of the outer rotor 54. The rotational axis can be defined by the axial centerline 12 of the CRT engine 10. The included angle 124 can be further defined as a non-zero acute angle. Specifically, the included angle can by any angle less than 90 degrees and greater than 0 degrees.

The included angle 124 can be uniform along the entirety of the outlet passage 112 such that the walls of the outlet passage 112 can be defined to be linear over an axial distance between the manifold outlet 120 of the fluid manifold 116 and the outlet 114 of the outlet passage 112. Alternatively, the included angle 124 can vary across the axial distance between the manifold outlet 120 and the outlet 114. For example, the walls of the outlet passage 112 can include sloped walls such that the included angle 124 nearest the manifold outlet 120 is larger than the included angle nearest the outlet 114.

In operation of the CRT engine 10, fluid can flow into the fluid manifold 116. This fluid flow within the fluid manifold 116 can be defined by a first tangential velocity VT1. The first tangential velocity VT1 can be parallel to the first rotational velocity U1. In other words, the fluid flow within the fluid manifold 116 can flow in the same direction as the rotational direction of the outer rotor 54. The fluid flow can then exit the fluid manifold 116 through the manifold outlet 120 and into the outlet passage 112. The fluid flow in the outlet passage 112 can exit through the outlet 114 and into the recess 106. The fluid flow within the recess 106 can be defined by a second tangential velocity VT2. The second tangential velocity VT2 can be parallel to the second rotational velocity U2. In other words, the fluid flow within the recess 106 can flow in the same direction as the rotational direction of the inner rotor 58 or the second set of airfoils 60. As such, the fluid passages 86 can redirect the fluid flow from the rotational direction of the outer rotor 54 to the rotational direction of the inner rotor 58.

Benefits of the present disclosure include a reduction of windage losses and an increase in the overall power output of the CRT engine when compared to conventional CRT engines. For example, conventional CRT engines can include various cooling systems or passages formed within the outer rotor and directed towards a portion of the blades coupled to the inner rotor. The cooling passages in conventional CRT engines, however, do not redirect the fluid flow resulting in the fluid exiting the cooling passages to be directly opposing the rotational velocity of the inner rotor. Specifically, the fluid flow exiting the cooling passages in the conventional CRT engines is in the same direction of rotation of the outer rotor. This results in windage losses as there is a direct resistance experienced by the blades attached to the inner rotor from the fluid exiting the cooling passages. This ultimately results in a decrease in power and efficiency of the CRT engine. The cooling passages as described herein, however, redirects the fluid flow within the fluid passage to be aligned with the rotational velocity of a blade downstream the outlet of the cooling passage. The redirection of the fluid flow eliminates the effects of windage losses, therefore, increasing the overall efficiency of the turbine engine. It is further contemplated, however, that the cooling passages accelerate the fluid flow. As the fluid flow is accelerated and in the direction of rotation of the downstream blade, the power created by the downstream blade is increased. This ultimately increases the overall power of the turbine engine providing further benefit over conventional CRT engines.

It is further contemplated that the power output of the CRT engine can be increased compared to conventional CRT engine without having to change other engine performance parameters. As used herein, engine performance parameters can be any operating parameter of the CRT engine which can directly affect the power output. These engine performance parameters can be, for example, a mass flow rate of the coolant or a rotational velocity of one of the rotating elements within the CRT engine. If, for example, the power output was to be increased in the conventional CRT engine, it can be necessary to adjust one or more of the engine performance parameters in order to increase the overall power output of the turbine engine. This, in turn, can require further changes to the conventional CRT engine. For example, if the rotational velocity of the inner and the outer rotors were to be increased so the power output of the engine would also be increased, a stronger material can be required in order to withstand the increased centrifugal forces created by the increased rotational velocities. This can in turn increase the difficulty of manufacture or the overall cost of the engine. The CRT engine as described herein, however, does not adjust these performance parameters but instead uses the redirection of the fluid flow to be aligned with the rotational velocity of a blade downstream the outlet of the cooling passage to increase the power output of the CRT engine. Therefore, no additional components or substitutions of materials are needed to increase the overall power output of the CRT engine.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

1. A counter-rotating turbine engine comprising a first rotor, rotating in a first rotational direction, and having multiple sets of circumferentially arranged blades, defining first rotor sets of blades that are axially spaced to define a gap between each set, a second rotor, rotating in a second rotational direction, counter to the first rotational direction, and having multiple sets of circumferentially arranged blades, defining second rotor sets of blades that are axially spaced and received within the gap of the first rotor, and a plurality of fluid passages formed in the first rotor with an outlet facing the gap, wherein the fluid passages have a passage centerline oriented to redirect a fluid flow within the fluid passages from the first rotational direction to the second rotational direction.

2. The counter-rotating turbine engine of any preceding clause wherein the first rotor is an outer rotor and the second rotor is an inner rotor such that the first rotor surrounds the second rotor.

3. The counter-rotating turbine engine of any preceding clause further comprising a fluid manifold fluidly coupled to the fluid passages.

4. The counter-rotating turbine engine of any preceding clause wherein the fluid manifold comprises a cavity formed in the outer rotor.

5. The counter-rotating turbine engine of any preceding clause wherein the cavity extends circumferentially around the outer rotor.

6. The counter-rotating turbine engine of any preceding clause wherein the first rotor is an inner rotor and the second rotor is an outer rotor such that the second rotor surrounds the first rotor.

7. The counter rotating turbine engine of any preceding clause wherein the inner rotor is fluidly coupled to a bypass air passage such that the plurality of fluid passages is fluidly coupled to the bypass air passage.

8. The counter-rotating turbine engine of any preceding clause further comprising a drum surrounding the first rotor and the second rotor and defining a space between the drum and one of either the first rotor or the second rotor and the space is fluidly coupled to the plurality of fluid passages.

9. The counter-rotating turbine engine of any preceding clause further comprising a compressor section and a turbine section, with the fluid passages located in the turbine section.

10. The counter-rotating turbine engine of any preceding clause further comprising a bypass air duct fluidly coupling the compressor section to the space.

11. The counter-rotating turbine engine of any preceding clause wherein the one of either the first rotor or the second rotor comprises a cavity fluidly coupling the space to the fluid passages.

12. The counter-rotating turbine engine of any preceding clause wherein the first and second rotor sets of blades define corresponding pairs, with the first rotor set being upstream of the second rotor set of the pair.

13. The counter-rotating turbine engine of any preceding clause wherein the outlet of the fluid passages for a given pair are downstream of a trailing edge for the first rotor set and upstream of a leading edge for the second rotor set.

14. The counter-rotating turbine engine of any preceding clause wherein the second rotor set of blades terminate in a tip with a leading edge and the outlet is located radially beyond the leading edge of the tip.

15. The counter-rotating turbine engine of any preceding clause wherein the first rotor defines a recess upstream of the leading edge of the tip and the outlet is located within the recess.

16. The counter-rotating turbine engine of any preceding clause wherein the passage centerline forms a non-zero included acute angle relative to a plane transverse to a rotational axis of the first and second rotors.

17. The counter-rotating turbine engine of any preceding clause wherein the included acute angle is less than 90 degrees.

18. A method of cooling a blade in a counter-rotating turbine engine having counter rotating first and second rotors, the method comprising emitting cooling air from the first rotor in a direction such that a component of the cooling is in the second rotational direction.

19. The method of any preceding clause further comprising supplying the emitted cooling air through cooling air passages in the first rotor.

20. The method of any preceding clause wherein the supplying of the cooling air further comprises supplying cooling air from a fluid manifold in the first rotor to the cooling air passages.

21. The method of any preceding clause wherein the supplying of cooling air further comprises supplying cooling air from a space between a drum surrounding the one of either the first rotor or the second rotor to the fluid manifold.

22. The method of any preceding clause wherein the supplying of cooling air further comprises bleeding air from a compressor section of the turbine engine to define a bleed air supply and supplying the bleed air supply to the space.

What is claimed is:

1. A counter-rotating turbine engine defining an engine centerline and comprising:
   a first rotor, rotating about a rotational axis in a first rotational direction, and having a body and at least two first pluralities of circumferentially arranged blades extending radially from the body with respect to the engine centerline, the at least two first pluralities of circumferentially arranged blade being spaced axially, with respect to the engine centerline, from one another to define a gap therebetween;
   a second rotor, rotating in a second rotational direction with respect to the rotational axis, counter to the first rotational direction, and having a second plurality of circumferentially arranged blades provided within the gap of the first rotor; and
   a plurality of fluid passages formed in the body of the first rotor with each fluid passage of the plurality of fluid passages extending continuously between an inlet directly fluidly coupled to a portion of the counter-rotating turbine engine exterior of the first rotor and an outlet facing the gap, with each fluid passage defining a passage centerline oriented to redirect a fluid flow within a respective fluid passage from the first rotational direction toward the second rotational direction.

2. The counter-rotating turbine engine of claim 1, wherein the first rotor is provided radially outwardly from the second rotor, with respect to the engine centerline, such that the first rotor surrounds the second rotor.

3. The counter-rotating turbine engine of claim 2, further comprising a fluid manifold fluidly coupled to the fluid passages.

4. The counter-rotating turbine engine of claim 3, wherein the fluid manifold comprises a cavity formed within the first rotor.

5. The counter-rotating turbine engine of claim 4, wherein the cavity extends circumferentially around an entirety of the first rotor, with respect to the engine centerline.

6. The counter-rotating turbine engine of claim 1, wherein the first rotor is provided radially inwardly from the second rotor, with respect to the engine centerline, such that the second rotor surrounds the first rotor.

7. The counter-rotating turbine engine of claim 1, further comprising a drum surrounding the first rotor and the second rotor and defining a space between the drum and one of either the first rotor or the second rotor, wherein the space is fluidly coupled to the plurality of fluid passages.

8. The counter-rotating turbine engine of claim 7, further comprising a compressor section and a turbine section, with the plurality of fluid passages being located within the turbine section.

9. The counter-rotating turbine engine of claim 8, further comprising a bypass air duct fluidly coupling the compressor section to the space.

10. The counter-rotating turbine engine of claim 8, wherein the one of either the first rotor or the second rotor comprises a cavity fluidly coupling the space to the fluid passages.

11. The counter-rotating turbine engine of claim 1, wherein each outlet of the plurality of fluid passages are provided downstream of a trailing edge of an upstream first plurality of circumferentially arranged blades of the at least two first pluralities of circumferentially arranged blades and upstream of a leading edge of the second plurality of circumferentially arranged blades.

12. The counter-rotating turbine engine of claim 11, wherein the second plurality of circumferentially arranged blades each terminate in a tip and include a leading edge, wherein the outlet is located radially outward from a portion of each blade of the second plurality of circumferentially arranged blades where the leading edge meets the tip.

13. The counter-rotating turbine engine of claim 1, wherein the passage centerline forms a non-zero included acute angle relative to a plane normal to the engine centerline and intersecting the passage centerline.

14. The counter-rotating turbine engine of claim 1, wherein each outlet of the plurality of fluid passages is provided axially forward of the second plurality of circumferentially arranged blades, with respect to the engine centerline.

15. The counter-rotating turbine engine of claim 1, wherein each fluid passage of the plurality of fluid passages are an enclosed passage with the inlet and the outlet.

16. A counter-rotating turbine engine defining an engine centerline and comprising:
   a first rotor, rotating about a rotational axis in a first rotational direction, and having a body and at least two first pluralities of circumferentially arranged blades extending radially from the body with respect to the engine centerline, the at least two first pluralities of circumferentially arranged blades being spaced axially, with respect to the engine centerline, from one another to define a gap therebetween;
   a second rotor, rotating in a second rotational direction, counter to the first rotational direction, and having a second plurality of circumferentially arranged blades provided within the gap of the first rotor; and
   a fluid passage continuously formed in the body of the first rotor and having an inlet directly fluidly coupled to a portion of the counter-rotating turbine engine exterior of the first rotor and an outlet facing the gap, the fluid passage defining a passage centerline oriented to redirect a fluid flow within the fluid passage from the first rotational direction toward the second rotational direction.

17. The counter-rotating turbine engine of claim 16, wherein the first rotor is provided radially outwardly form the second rotor, with respect to the engine centerline, such that the first rotor surrounds the second rotor.

18. The counter-rotating turbine engine of claim 16, wherein the fluid passage comprises:
   an inlet passage including the inlet;
   a fluid manifold extending circumferentially about at least a portion of the first rotor, with respect to the engine centerline; and
   an outlet passage having the outlet,
   wherein the fluid manifold fluidly couples the inlet passage to the outlet passage, and the fluid flow within the fluid passage is supplied from the inlet passage, through the fluid manifold and to the outlet passage.

19. The counter-rotating turbine engine of claim 18, wherein the fluid passage includes a plurality of outlet passages circumferentially arranged about the first rotor, with respect to the engine centerline, and fluidly coupling the fluid manifold to a portion of the gap upstream of the second plurality of circumferentially arranged blades.

20. The counter-rotating turbine engine of claim 16, wherein the outlet is provided axially forward of the second plurality of circumferentially arranged blades, with respect to the engine centerline.

* * * * *